US005522690A

United States Patent [19]

Pickering

[11] Patent Number: 5,522,690

[45] Date of Patent: Jun. 4, 1996

[54] AUTOMATIC WICKETTING APPARATUS

[75] Inventor: Gordon F. Pickering, Lyons, N.Y.

[73] Assignee: Huntsman Design Products Corporation, Salt Lake City, Utah

[21] Appl. No.: 438,782

[22] Filed: May 11, 1995

[51] Int. Cl.$^{6}$ ........ B65G 29/00

[52] U.S. Cl. ........ 414/27; 271/903; 414/908

[58] Field of Search ........ 414/27, 908, 923; 271/220, 903; 53/572; 493/204

[56] References Cited

U.S. PATENT DOCUMENTS

| | | | |
|---|---|---|---|
| 4,231,558 | 11/1980 | Aterianus et al. | 414/27 |
| 4,286,907 | 9/1981 | Houle et al. | 414/27 |
| 4,333,298 | 6/1982 | Lehmacher | 53/447 |
| 4,668,148 | 5/1987 | Sample et al. | 414/27 |
| 4,796,499 | 1/1989 | Achelpohl | 414/27 |
| 4,925,439 | 5/1990 | Schneider | 493/204 |
| 5,030,191 | 7/1991 | Reifenhauser | 414/27 |

*Primary Examiner*—David A. Bucci
*Assistant Examiner*—Douglas A. Hess
*Attorney, Agent, or Firm*—Russell R. Stolle; Ron D. Brown; Thomas J. Wall

[57] ABSTRACT

Apparatus for automatically removing bags from a supply conveyor and stacking a predetermined number of bags upon raised pins. The stacks are then placed on a stack transfer assembly that is then moved into a transfer station wherein the stacks are placed on wickets. An endless accumulator conveyor is arranged to deliver the wickets into the transfer station in timed relation with the movement of the transfer assembly between stations.

6 Claims, 9 Drawing Sheets

AUTOMATIC WICKETTING APPARATUS

BACKGROUND OF THE INVENTION

This invention relates to apparatus for automatically stacking bags and loading the stacks upon wickets. Bags such as plastic bags for packaging bread and other products are typically manufactured on special equipment and then placed in stacks upon wickets for delivery to the producer of the product. A wicket is a wire device having two spaced apart arms that are arranged to be received in holes formed in the top section of the bags. When a desired number of bags have been loaded upon the arms, rubber grommets am placed over the arms to hold the stack in place. The wickets are designed so that they are compatible with the producer's product loading equipment.

Heretofore, the loading of bags upon the wickets has been a manual task requiring the loader to tightly grasp a stack leaving the manufacturing equipment, aligning the holes in the bags with the wicket arms and sliding the stack over the arms. This type of manual operation is not only fatiguing, but also results in the stacks becoming misaligned or dropped, thus causing unwanted delays in the manufacturing process.

SUMMARY OF THE INVENTION

It is therefore an object of the present invention to fully automate the stacking and loading of bags upon wickets.

It is a further object of the present invention to provide automatic equipment for taking bags from a manufacturing machine, placing the bags in stacks and loading the stacks upon wickets.

It is still a further object of the present invention to eliminate the manual operations involved in the placing of bags on wickets.

Another object of the present invention is to provide automatic bag stacking and wicket loading equipment that will avoid unwanted delays in the bag manufacturing procedure.

Yet another object of the present invention is to reduce exposure to repetitive motion injuries associated with the stacking and loading of bags upon wickets.

These and other objects of the present invention are attained by automatic equipment for stacking bags having wicket receiving holes formed therein and loading the stacks upon wickets. A loading wheel having stacker bars for mounting bags coming from a manufacturing machine in stacks upon pins and then indexing the stacks to a loading station. A stack transfer assembly picks the stacks up from the stacker bars and moves the stacks to a transfer station wherein the stacks are placed upon wickets. The wickets are carried upon an endless conveyor and the movement of the wickets are coordinated with that of the transfer assembly and the loading wheel whereby the stacks flow in a steady stream from the stacking and loading equipment.

BRIEF DESCRIPTION OF THE DRAWINGS

For a better understanding of these and other objects of the present invention, reference will be made to the following detailed description of the invention which should be read in association with the accompanying drawings wherein.

DESCRIPTION OF THE INVENTION

Figure 1:
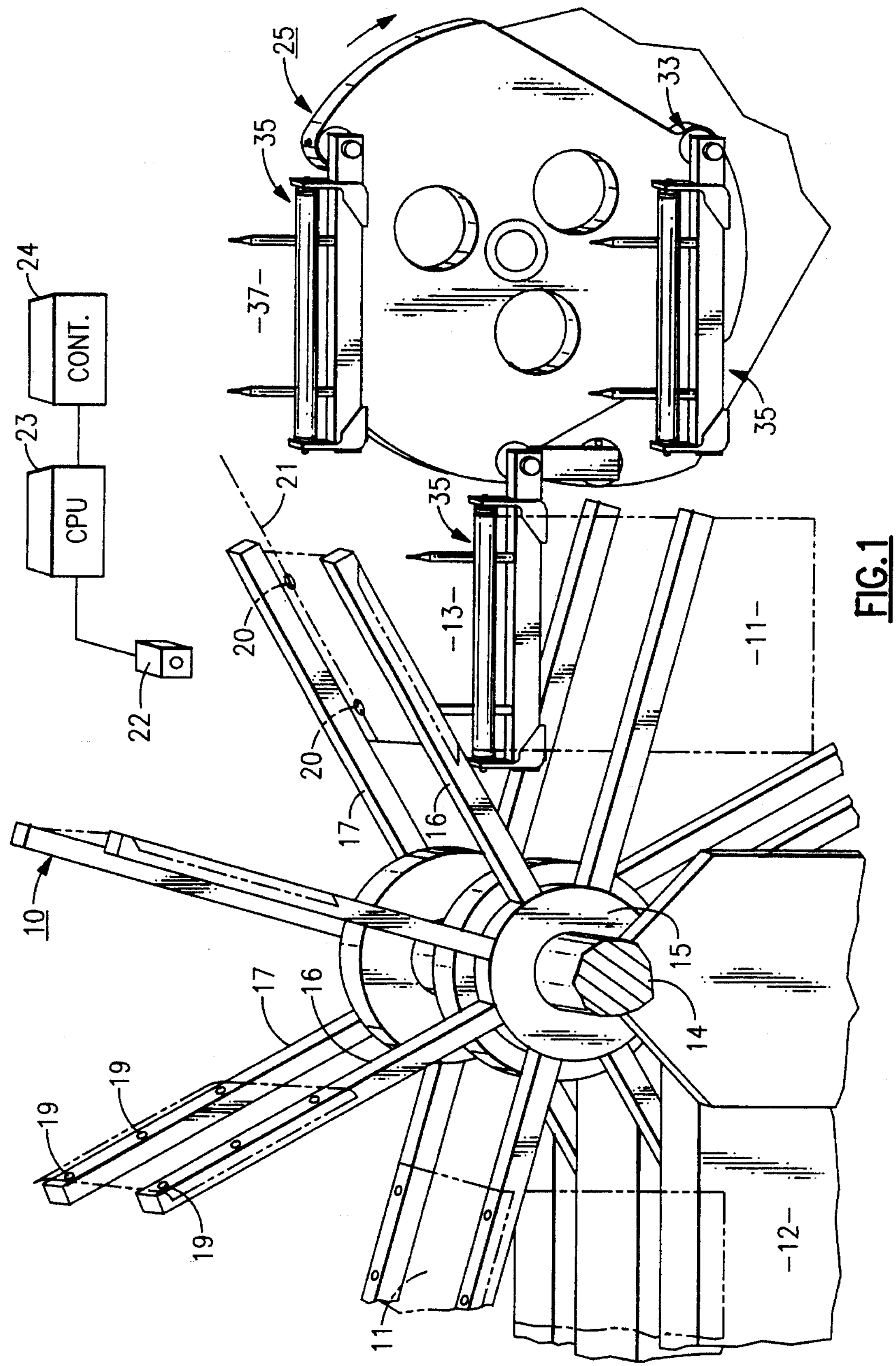
FIG. 1 is a perspective view showing a paddle wheel conveyor for placing bags coming off a bag production machine upon stacker bars mounted upon a stacker wheel.

Referring initially to FIG. 1, there is shown a paddle wheel conveyor generally referenced 10 for picking up bags 11 from a supply station 12, and conveying the bags to a stacking station 13. The paddle wheel conveyor includes a shaft 14 that is keyed to a hub 15. A series of parallelly aligned spokes 16 and 17 emanate from the hub. The spokes 16 and 17 each contain a series of vacuum ports 19—19 that are arranged to secure bags placed over the spokes to the paddle wheel conveyor. Each of the bags placed between the spokes contain a pair of wicket receiving holes 20—20 that are aligned with a common plane 21.

The paddle wheel conveyor is rotated at a predetermined angular velocity so that bags are carried seriatim into the bag stacking station 13 at a predetermined rate. A sensor 23 is positioned adjacent to the paddle wheel conveyor which is adapted to sense the passage of the spokes as they enter the stacking station. The sensor counts the number of the bags delivered into a stacking station and this information is sent to a computer 24 that is arranged to store the count, process this information, and issue command signals to a controller 24.

Figure 2:
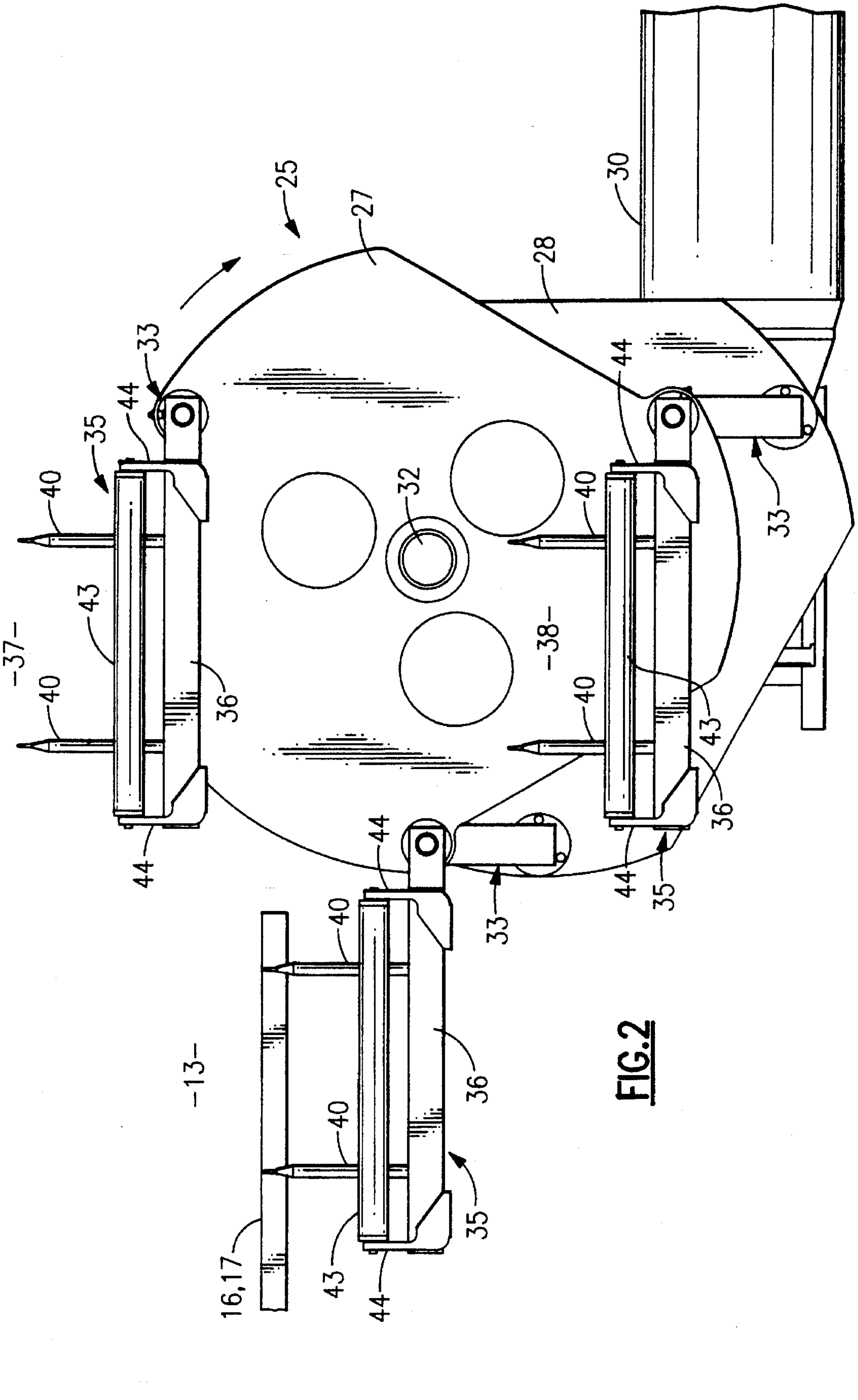
FIG. 2 is an enlarged front elevation of the stacker wheel shown in FIG. 1.
Figure 3:
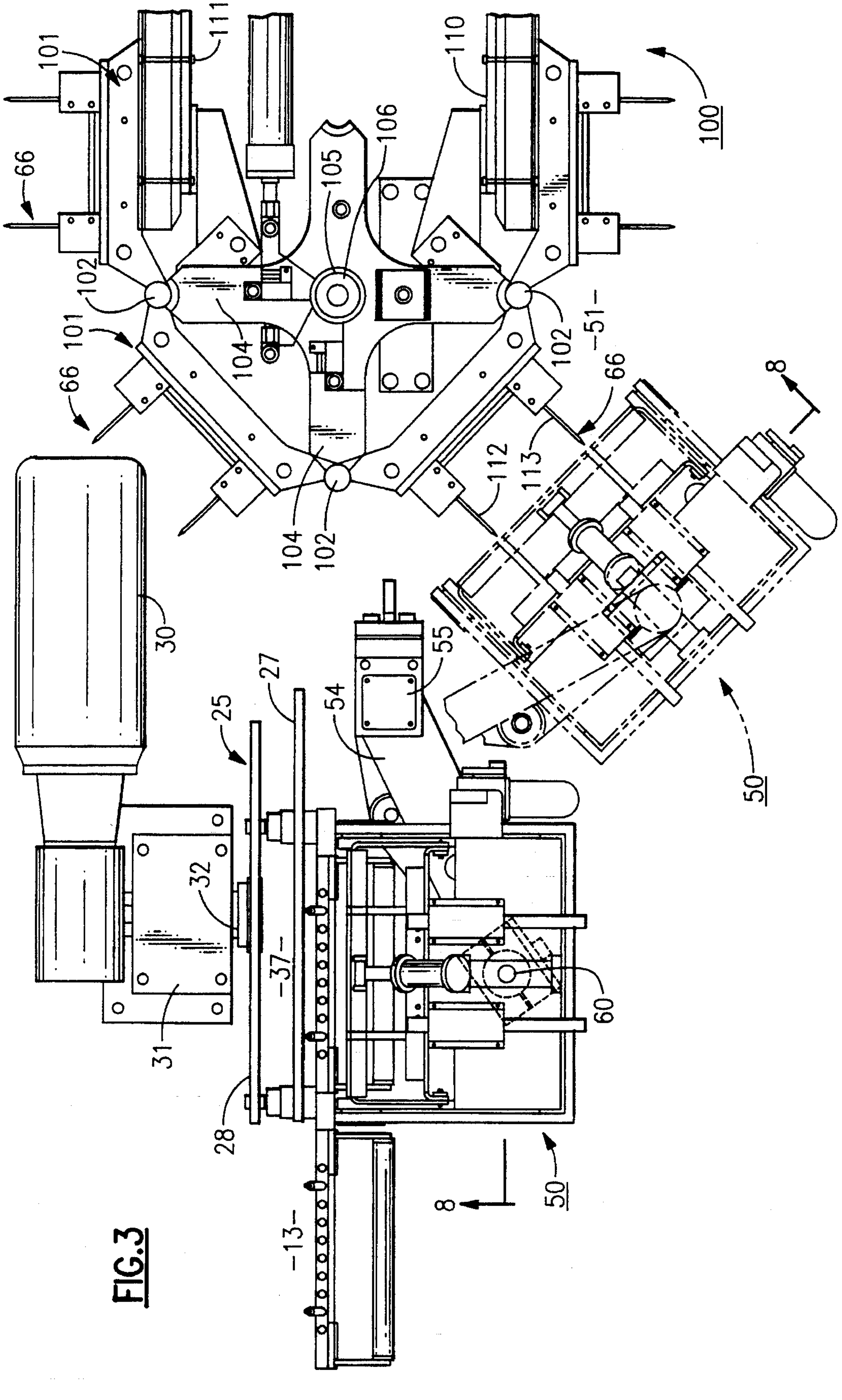
FIG. 3 is a top plan view showing a stack transfer assembly for removing stacks from the stacker wheel and placing them on wickets carried upon an endless accumulator conveyor.

A stacker wheel generally referenced 25, is mounted adjacent to the stacking station 13. With further reference to FIGS. 2 and 3, the transfer disc includes a front plate 27 which is connected to a back plate 28 so that both plates can rotate together as a unit. The stacker wheel is driven by a stepper motor 30 acting through a gearbox 31. A shaft 32 connects the gear box to the back plate 28. The back plate, in turn, is connected to the front plate by rotor control link assemblies 33—33. Stacking bar units 35—35 are rotatably coupled to the rotor control link assemblies so that the support beams 36—36 of each stacker bar unit remains in a horizontal position as the stacker wheel is rotated in the direction indicated in FIG. 2.

The stacker wheel is arranged so that it is indexed by the stepper motor upon command from the controller in 120° increments when a predetermined count is reached. The stacking bar units are thus indexed in series through the previously noted stacking station 13, a second loading station 37 and a third stand-by station 38. Each stacker bar unit includes the previously noted support beam and a pair of upraised pins 40—40 secured in the beam. The pins are spaced apart on the beam at the same center distance as the wicket receiving holes 20—20 in the bags. The stacking wheel is positioned adjacent to the paddle wheel conveyor 10 so that the pins of a stacker bar unit is brought into alignment with the bag holes when the stacker bar unit is positioned in the stacking station. Accordingly, bags carried into the stacking station on the paddle wheel conveyor are automatically placed over the pins of the stacker bar. Stop bars 42—42 (FIG. 4) are mounted upon the pins which engage the first bag placed upon the pins and thus limit the vertical travel of a stack along the pins.

Figure 4:
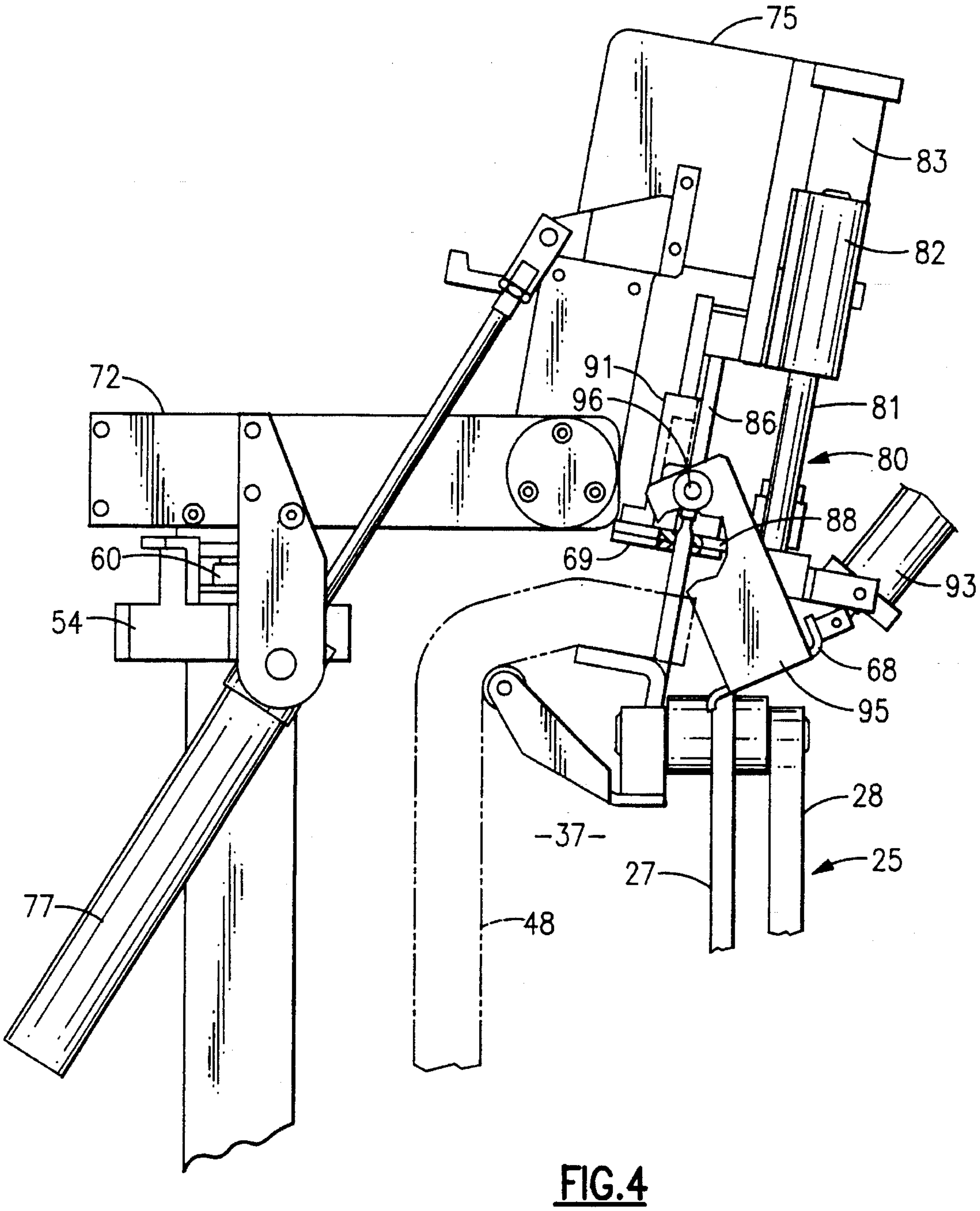
FIG. 4 is an enlarged partial side elevation showing the rotating arm of the stack transfer assembly and a pick-up head mounted on the arm with the jaws of the pick-up head in an open position preparatory to engaging a stack mounted on the stacker wheel.
Figure 5:
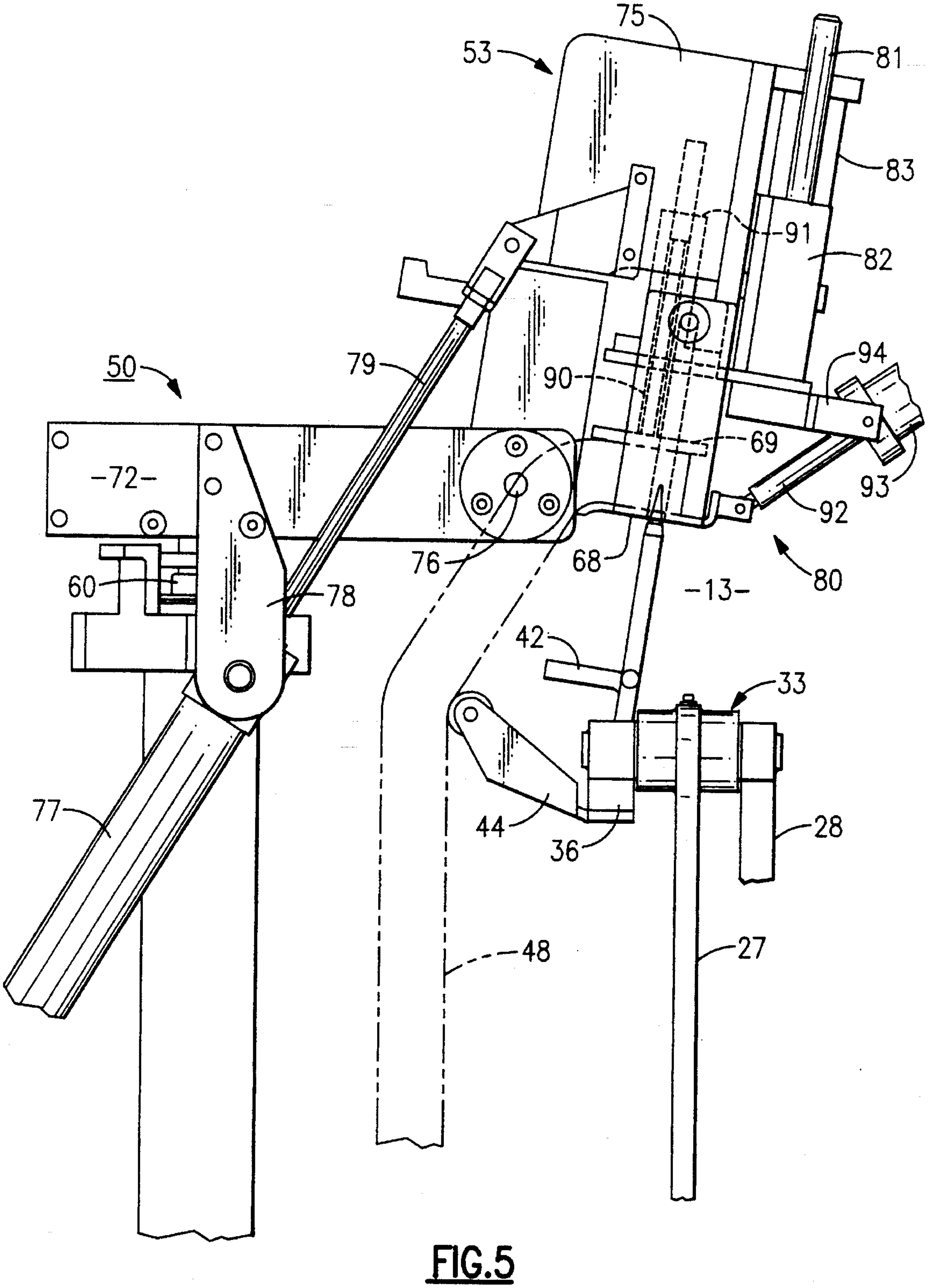
FIG. 5 is an enlarged partial side; elevation showing the jaws of the pick-up head in a stack clamping position.
Figure 6:
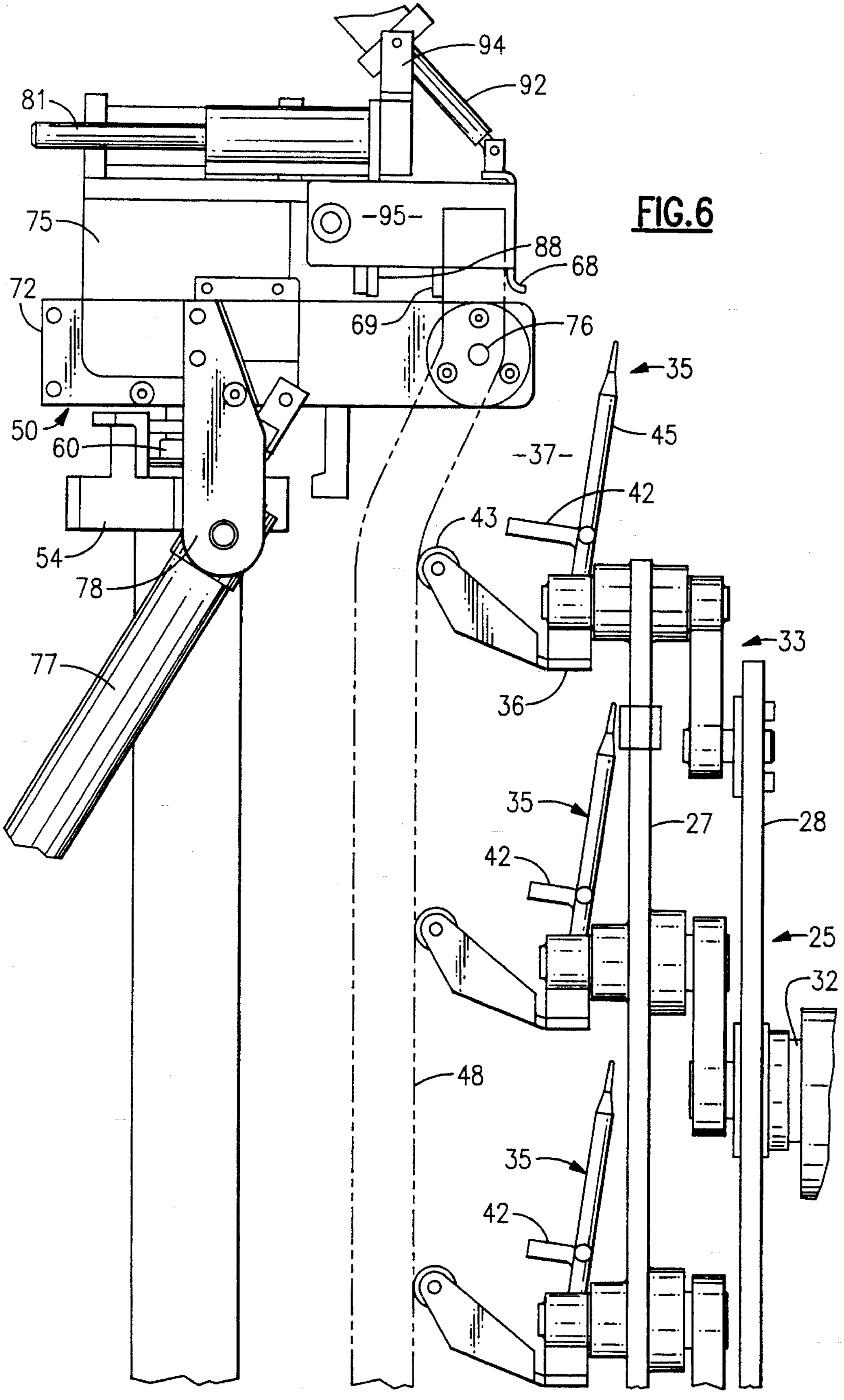
FIG. 6 is an enlarged partial side elevation showing the pick-up head of the stack transfer assembly in a home position.

A roller 43 is attached to the front of each support beam by end brackets 44—44. Bags that are stacked upon the pins hang down and are draped over the roller as shown in FIGS. 4–6. The roller helps to position the main body of the stack well forward of the stacking disc components. As noted above, the bags stacked upon the pins are counted and when a desired count is reached, the stacker wheel is indexed 120° to bring a complete stack 48 into the loading station 42.

With further reference to FIG. 3 a stack transfer assembly generally referenced 50, is arranged to pick up a stack of bags in the loading station 37 and, as will be explained in greater detail below, transfer the stack to a transfer station 51 where the stacks are automatically placed upon wickets. The assembly includes a pick-up head 53 that is carried upon the distal end of a pivot arm 54. The stack transfer assembly, is depicted in FIG. 3 in full line detail positioned in the loading station and in phantom outline in the transfer station 51.

Figure 8:
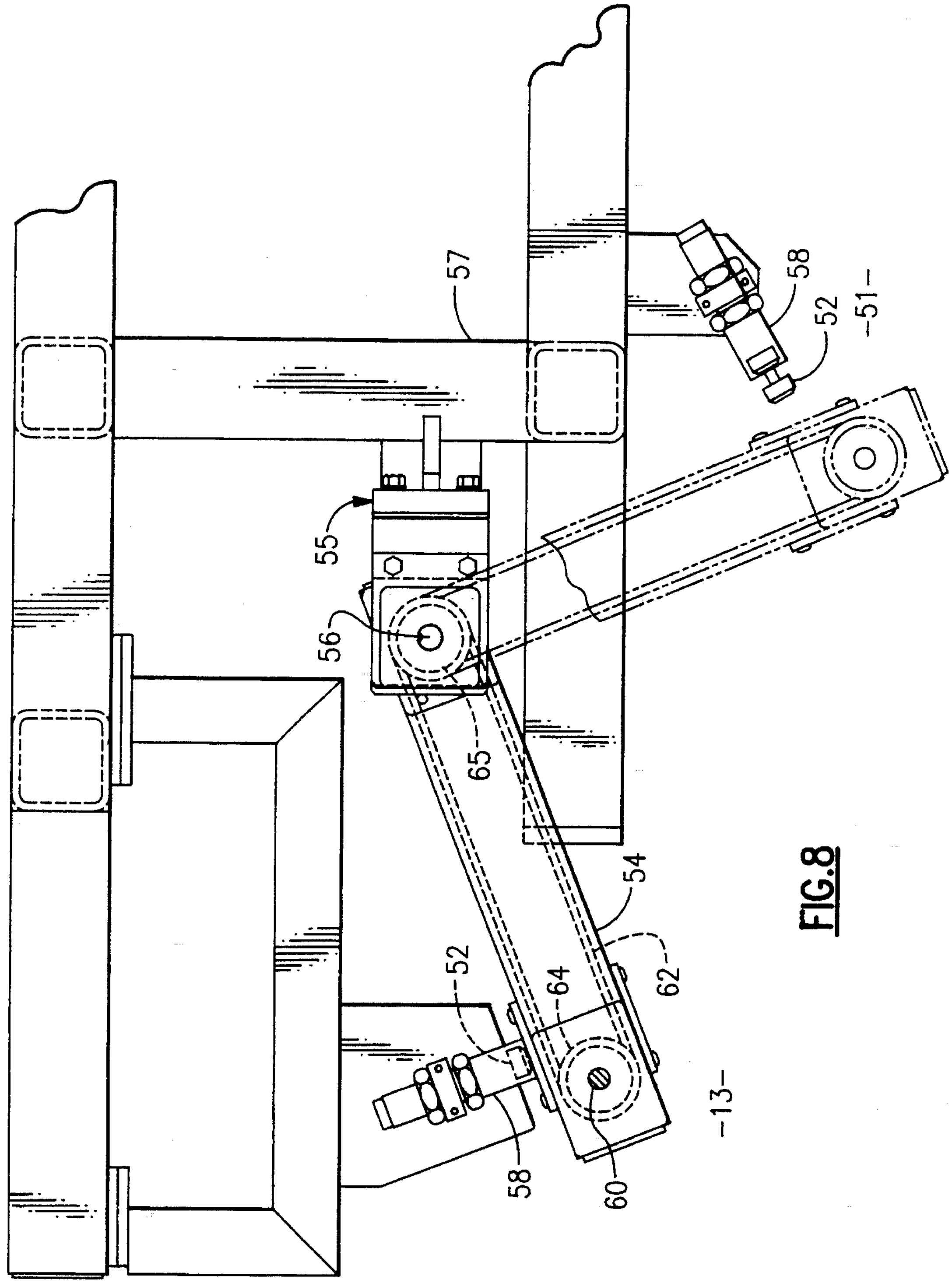
FIG. 8 is an enlarged partial side elevation taken along lines 7—7 in FIG. 3 showing the rotating arm of the stack transfer assembly in greater detail.

As best illustrated in FIG. 8, the pivot arm 54 is connected to a pneumatic actuator motor 55 by means of a shaft 56. The actuator motor is supported in stationary frame 57. Also mounted in the frame are a pair of adjustable sensor switches 58 and 59 located respectively in the loading station 37 and the transfer station 51. The switch contacts 52—52 are arranged to be depressed by the pivot arm which sends a signal through the controller to inactivate the actuator motor when the transfer assembly is properly positioned within either the loading or transfer station.

The pick-up head 53 of the transfer assembly is pivotally mounted at the distal end of the pivot arm by means of a pivot shaft 60 so that the head can rotate independently within the arm 54. The pivotal movement of the head within the arm is controlled by means of a timing belt 62 (FIG. 8) that is trained about timing sprockets 64 and 65. Timing sprocket 64 is keyed to shaft 60 while timing sprocket 65 is similarly keyed to shaft 56. The timing belt coordinates the motion of the articulated pick up head with that of the pivot arm to position the head adjacent to a stacker bar unit when the assembly is located in the loading station and adjacent to a wicket 66 (FIG. 3) when the assembly is located in the transfer station.

As illustrated in FIG. 4, the pick-up head 53 of the transfer assembly is shown with the clamping jaws 68 and 69 of the head in an open position preparatory to engaging a bag stack 48 mounted on the stacker bar unit located in the loading station 37. The head includes a horizontally disposed platform 72 that is affixed to shaft 60 so that the platform rotates with the shaft in a horizontal plane. A housing 75 is pivotally mounted on the platform by means of a pivot 76 mounted in suitable bearing blocks so that the housing can rotate in a vertical plane within the platform. At this time the housing is tilted to the position shown by means of a tilt cylinder 77 that is secured to the platform by a support member 78. A carriage 80 is movably mounted in the top of the housing upon guide rails 81 that are slidably contained in slide blocks 82 affixed to the housing. The carriage is arranged to move over a reciprocal path of travel by means of carriage drive cylinder 83. A backing plate 85 is secured to the distal end of the rails and is arranged to move toward and away from the stack contained on the stacker bar unit situated in the loading station. A pair of locating tubes 86 are mounted in the backing plate so that they move along the reciprocal path of travel with the backing plate.

The clamping jaws 68 and 69 of the head are movably contained within the carriage. The rear jaw 69 is connected to the piston rod 90 of drive cylinder 91 so that the rear jaw can move independently toward and away from the backing plate of the carriage. The front jaw 68 of the stack clamping mechanism is pivotally mounted in the distal end of the piston rod 92 of a second drive cylinder 93 which, in turn, is pivotally supported in raised member 94 affixed to the carriage. A pair of control links 95 are also attached to the front jaw and adapted to swing about rotors 96 secured in the carriage.

The jaws of the clamping mechanism are positioned as shown in FIG. 4 when the pick-up head of the transfer assembly is first brought into the loading station. At this time, the carriage is moved to a fully extended position to bring the open ends of the locating tubes over the tips of the stacker bar pins and the rear jaw of the clamping mechanism brought back against the backing plate of the carriage. Openings are provided in the rear jaw to permit the locating tubes to protrude slightly beyond the front face of the rear jaw when in this position. The front jaw drive cylinder 93 is now extended which, acting in conjunction with the control links 95, causes the jaw to swing back clear of the top of stack 48 mounted upon the pins.

The jaw drive cylinders are now actuated from a signal from the controller to bring the jaws together. Initially, under the influence of the control links the front jaw 68 now swings down over the front face of the stack into parallel alignment with the rear jaw 69. Slots are provided in the front jaw which allow the jaw to move freely over the stacker pin. Once the jaws are in parallel alignment, they continue to move together to securely clamp the stack therebetween. With the stack so secured between the jaws, the carriage is retracted to pull the stack upwardly over the pins as illustrated in FIG. 5.

Figure 7:
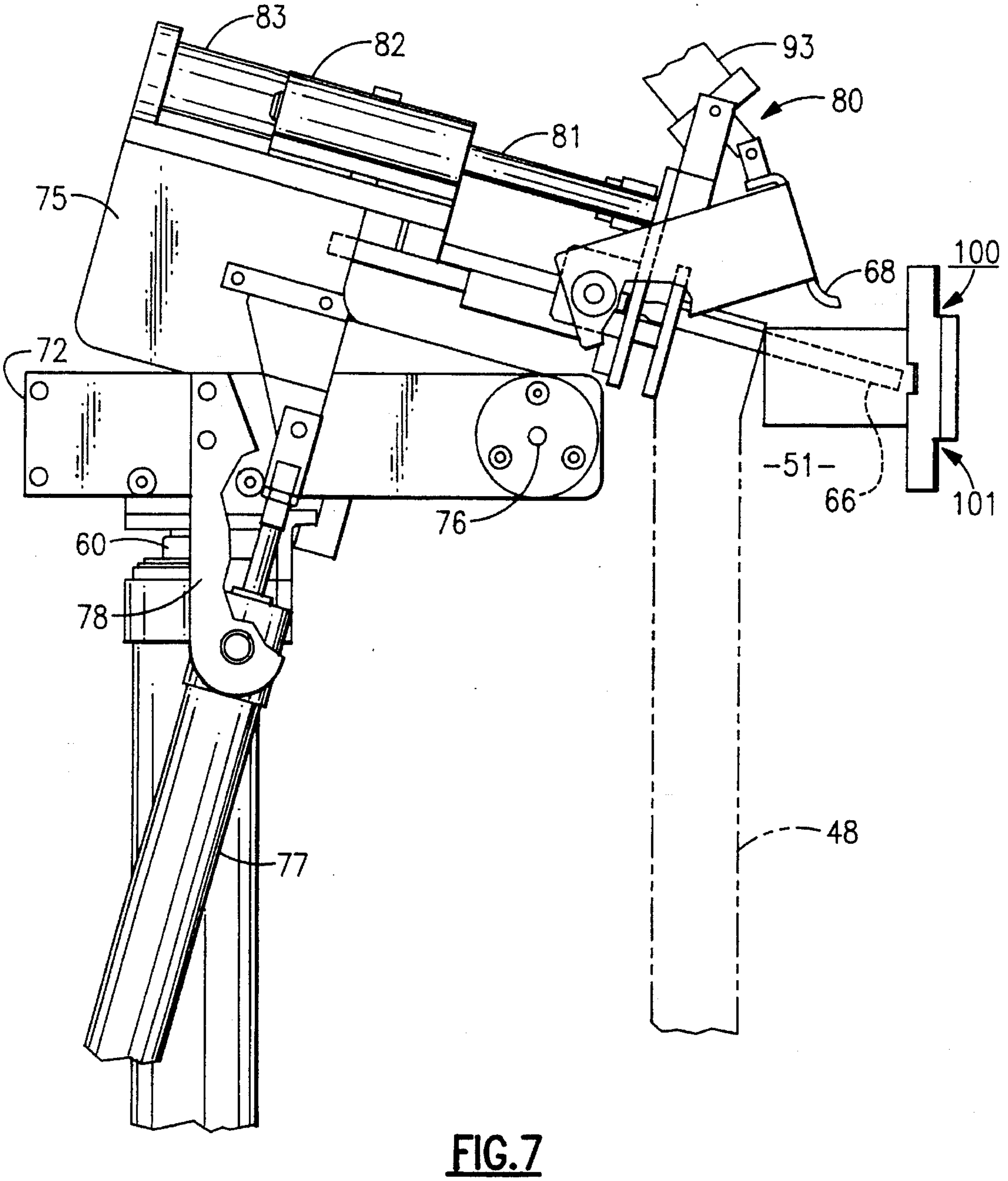
FIG. 7 is an enlarged side elevation showing the transfer assembly position in a transfer station.

With the stack free of the pins, the piston rod 79 of the tilt cylinder is retracted to bring the housing of the pick-up head into a home position wherein the housing is seated upon the platform 72, as illustrated in FIG. 6. At this time, the stack remains tightly clamped between the jaws of the pick-up head. Upon instruction from the controller, the rotor arm 54 of the transfer assembly is rotated by pneumatically actuated motor into the transfer station. At the same time, the head is rotated by the timing belt arrangement into alignment with a wicket 66 mounted in the transfer station as illustrated in FIG. 7.

The wickets 66 are removably mounted upon an endless belt accumulator conveyor 100 (FIG. 3). The conveyor includes a series of wicket support units 101 that are linked together by vertically disposed hinge pins 102. The conveyor is mounted between a pair of sprocket wheels 103, one of which is depicted in FIG. 3. Each sprocket contains a series of extended arms 104 attached to a central hub 105 that is rotatably supported in a vertically disposed shaft 106. An indexing motor (not shown) is coupled to one of the sprocket shafts and is arranged to index the wicket support units into the transfer station in timed coordination with the transfer assembly. The support units are guided along linear paths of travel between the sprockets by means of opposed horizontally disposed guide members 110 and 111.

When the transfer assembly is positioned in the transfer station as shown in FIG. 3, the arms 112 and 113 of the wicket positioned in the transfer station lie in the same plane as the locating tubes and the wicket receiving holes in the stack. As illustrated in FIG. 7, at this time the piston rod of the tilt cylinder is extended by a signal from the controller to tip the housing forward to place the arms of the wicket in coaxial alignment with the locating tubes and the wicket receiving holes in the bags. The carriage is moved forward so that the wicket arms move through the bag holes in the stack and enter the open distal ends of the locating tubes. At this point, the jaw drive cylinders are actuated by the controller to separate the jaws and thus release the stack from the pick-up head and the head is then returned to its home position. The accumulator conveyor is now indexed one position to bring an empty wicket into the transfer station and the transfer assembly is again readied to pick up another stack in the loading station. The stacks that are collected upon the accumulator conveyor are secured to the wicket by placing rubber grommets over the wicket arms and the wickets removed from the conveyor. Fresh wickets are placed in the empty support units.

Figure 9:
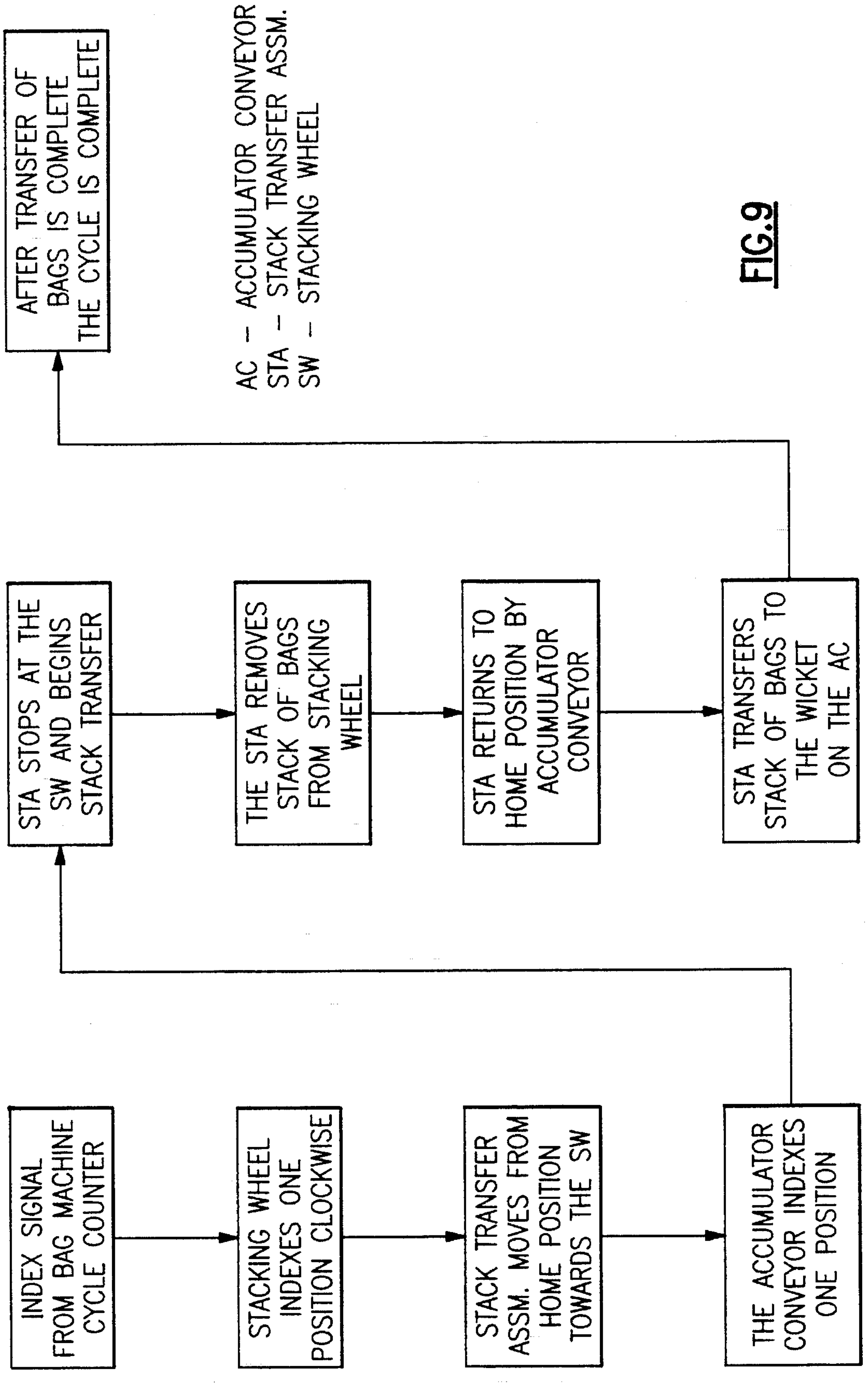
FIG. 9 is a flow diagram showing the operation of the bag stacking and stack loading equipment.

The operation of the present stacking and loading apparatus will be described in further detail with reference to the flow diagram shown in FIG. 9. Initially, an indexing signal is generated from the bag machine cycle counter when a predetermined count has been reached. The indexing signal is applied to the stacking disc stepping motor causing the disc to index 120°. This brings the stack into the stack loading station and an empty stacker bar unit into the stacking station. The stack transfer assembly now moves via the support arm from the transfer station into the loading station which, at the same time, the accumulator conveyor is indexed one position to bring an empty wicket into the transfer station.

The stack transfer assembly makes the sensor switch in the loading station and the stack loading sequence is initiated. The housing of the pick-up head is tilted to place the locating tubes in alignment with the pins of the stacker bar unit and the jaws of the head are closed to clamp the stack between the jaws. The carriage of the pick-up head is retracted thus removing the stack from the stacker bar. The head is returned to its home position and the stack transfer assembly is returned to the transfer station.

When returned to the transfer station, the housing of the pick-up head is tilted to align the arms of a wicket positioned in the station with the bag holes in the stack and the carriage moved forward to pass the arms through the holes. The jaws of the pick-up head are separated thus freeing the stack from the stack transfer assembly. The head is returned to its home position and the cycle is repeated a number of times until the desired number of wickets are loaded.

The actuator of the stack transfer assembly pneumatic motor and the pick-up head drive cylinders are carried out in a timed sequence in response from appropriate control signals from the central processing unit. The control sequence of events is completed within the time frame allotted for stacking the desired number of bags upon the stacking discs. As a result, a uniform steady flow of bag stacks are loaded onto the stack accumulator without the need of a manual operation. This considerably reduces operator fatigue and machine down time due to mishandling or misalignment of the stacks during the transfer operation.

While this invention has been explained with reference to the structure disclosed herein, it is not confined to the details set forth and this invention is intended to cover any modifications and changes as may come within the scope of the following claims:

What is claimed is:

1. Apparatus for automatically stacking bags having aligned wicket receiving holes and placing the stacks upon wickets that includes

- a bag feeder for delivering bags seriatim into a bag stacking station with the wicket receiving holes of said bags lying in a common plane,
- loading means for periodically indexing stacker bar units into said stacking station and then into a stack loading station, said stacker bar units each having upraised pins that are spaced in alignment with the wicket receiving holes and which lie in said common plane when said stacker bar unit is in said stacking station so that bags delivered into said stacking station are placed upon said pins,
- indexing means for moving said stacker bar unit from the stacking station into the stack loading station when a predetermined number of bags are placed upon the pins of said stacker bar unit,
- a stack transfer assembly mounted for movement between said loading station and a transfer station, said transfer station containing a wicket having arms that are spaced in alignment with the holes in said bags,
- drive means for moving the transfer assembly between the loading station and the transfer station,
- said stack transfer assembly further including a positionable head containing hollow tubes that are spaced apart in alignment with the holes in said bags, and articulating means for reciprocating the head between a home position and a stack receiving position when the assembly is in the loading station wherein the tips of the pins are inserted into the tubes and between the home position and a stack ejecting position when the assembly is in the transfer station wherein the wickets are inserted into the tubes,
- clamping means associated with said head having jaws operable when the head is in the stack receiving position to clamp together bags mounted upon said pins into a stack and moving the stack from the pins onto the tubes and for removing the stack from the tubes onto the wicket when the head is in the stack ejecting position.

2. The apparatus of claim 1 that includes an endless accumulator conveyor containing a plurality of wicket support members and advancing means for moving an empty wicket into said transfer station prior to the transfer assembly moving a stack into the transfer stations.

3. The apparatus of claim 1 wherein said positionable head is pivotally mounted upon a rotatable arm and further including means to coordinate the motion of the head with that of the arm to position the head in the loading station and the transfer station.

4. The apparatus of claim 1 wherein said jaws include a back jaw for contacting the back of said stack and a pivotally mounted front jaw, and first means to raise and lower said front jaw over the top of the stack and second means for moving the front jaw toward and away from said back jaw.

5. Apparatus for transporting a stack of bags having wicket receiving holes therein from a loading station onto wickets located in a transfer station, said apparatus including, a stack transfer means mounted for movement between a stack loading station containing a stack of bags having wicket receiving holes formed therein and a stack transfer station, said stack transfer station containing a wicket having spaced apart arms that are aligned with the holes formed in the bags contained in said stack, drive means for moving the transfer means between the loading station and the transfer station, and said stack transfer means further including a positionable head containing clamping means having a rear jaw movably contained within a carriage and connected to a piston rod of a drive cylinder, said clamping means further having a front jaw movably contained with said carriage and connected to a second piston rod of a second drive cylinder, wherein said front Jaw and said rear jaw are operable when the head is in the loading station to clamp a stack in said loading station between said jaws, placing the stack on said wicket in said transfer station wherein the wicket arms are passed through the holes in the bags contained in said stack, and opening said jaws to release the stack from said transfer means.

6. The apparatus of claim 1 wherein the indexing means for moving said stacker bar unit from the stacking station into the stack loading station further includes a counter for counting the number of bags that are delivered to said stacking station and indexing the stacker bar unit when a predetermined count is reached.

* * * * *

UNITED STATES PATENT AND TRADEMARK OFFICE

Certificate

Patent No. 5,522,690 | Patented: June 4, 1996

On petition requesting issuance of a certificate for correction of inventorship pursuant to 35 U. S. C. 256, it has been found that the above-identified patent, through error and without deceptive intent, improperly sets forth the inventorship.

Accordingly, it is hereby certified that the correct inventorship of this patent is: Gordon F. Pickering, Lyons, N.Y.; Richard E. Partch, Palmyra, N.Y.; Stewart L. Fluent, Cedar Falls, Iowa; and Colin R. Hart, St. Joseph, Mo.

Signed and Sealed this Twenty-fourth Day of March, 1998.

KAREN M. YOUNG
*Supervisory Patent Examiner*
Patent Examining Art Unit 3617